United States Patent [19]

Benavides

[11] Patent Number: 5,053,930
[45] Date of Patent: Oct. 1, 1991

[54] PHOSPHORESCENT VEHICLE PART IDENTIFICATION SYSTEM

[76] Inventor: Butch Benavides, 828 E. Parkerville Rd., DeSoto, Tex. 75115

[21] Appl. No.: 501,474

[22] Filed: Mar. 30, 1990

Related U.S. Application Data

[63] Continuation of Ser. No. 266,887, Nov. 3, 1988, Pat. No. 4,928,212.

[51] Int. Cl.⁵ .............................................. B60Q 3/00
[52] U.S. Cl. ...................................... 362/80; 362/84; 250/465.1
[58] Field of Search .................. 16/DIG. 30; 362/61, 362/80, 84, 109, 253, 34; 40/593; 250/465.1, 466.1

[56] References Cited

U.S. PATENT DOCUMENTS

| | | | |
|---|---|---|---|
| 1,705,069 | 3/1929 | Saurman | 250/465.1 |
| 2,648,758 | 8/1953 | Kroll et al. | 250/466.1 |
| 3,449,558 | 6/1969 | Whitmer . | |
| 4,076,645 | 2/1978 | Vega | 252/188.3 |
| 4,172,063 | 10/1979 | O'Brien | 260/29.65 |
| 4,452,720 | 6/1984 | Harada et al. | 252/301.76 |
| 4,629,583 | 12/1986 | Goguen | 252/301.35 |
| 4,632,773 | 12/1986 | Neefe | 252/301.35 |
| 4,647,400 | 3/1987 | Dubroca et al. | 252/301.16 |

Primary Examiner—Stephen Husar
Attorney, Agent, or Firm—Johnson & Gibbs

[57] ABSTRACT

A phosphorescent vehicle part identification accessory comprising an article or molded plastic having formed therewith a phosphorescent compound adapted for glowing for a period of time following exposure to light energy. The phosphorescent article is secured to the vehicle in a location thereon for receiving illumination from other vehicles and external light sources and providing a decaying glow therefrom. The phosphorescent article may comprise a vehicle wheel valve stem cap, a strip, or a tab adapted for positioning about a vehicle keyhole.

2 Claims, 2 Drawing Sheets

PHOSPHORESCENT VEHICLE PART IDENTIFICATION SYSTEM

This is a continuation of application Ser. No. 266,887 filed Nov. 3, 1988, now U.S. Pat. No. 4,928,212.

BACKGROUND OF THE INVENTION

1. Field of the Invention

The present invention pertains to vehicle accessory systems and, more particularly, to phosphorescent vehicle part identification systems for improving use of the vehicle at night.

2. History of the Prior Art

Vehicles such as bicycles and automobiles have long been the subject of innovative accessory design. Many of the accessory products developed for such vehicles have included items for facilitating use of the vehicle and/or convenience. Of particular significance is the safety aspect with regard to vehicles, particularly smaller vehicles such as bicycles and motorcycles.

A number of products have been developed for enhancing the safety and visibility of bicycles, motorcycles and even automobiles during the night-time hours. These innovations have included obviously complex systems such as structural and functional apparatus enhancing the mechanical stability and reliability of the particular vehicle. However, more aesthetic devices such as reflective panels and related paraphernalia have likewise found widespread acceptance. Reflective devices have been made for securement to bumpers of motor vehicles, mud flaps of commercial vehicles, fenders, frames and spokes of bicycles, and fenders and trailer units of motorcycles. Each of these reflective devices have facilitated visibility of the associated vehicle during night-time travel, thereby imparting safety as well as affording a degree of convenience to the user. In many instances the reflective device is fabricated from inexpensive material and also used for aesthetics such as novel applications to emphasize the motion of the vehicle and/or portions thereof.

The utilization of reflective materials as novelty items has not been centered in the area of vehicles. Such reflective devices have found applications in a myriad of articles commonly used in the evening hours. These articles include, for example, running paraphernalia such as jogging vests and shoes. It is well known that runners use streets for exercise areas, and during the evening hours it is important that the drivers of vehicles clearly see the runners. For this reason a number of reflective substances have been utilized, many of which are both flexible, water proof, inexpensive and reliable. More recently, a phosphorescent polymer-containing composition has been utilized in running shoes as set forth in U.S. Pat. No. 4,629,583. As set forth herein, the phosphorescent pigment is molded into footwear including the shoe soles so that the articles glow in the dark for a period of time following their exposure to light. Such is the characteristic of phosphorescent material, in that it does emit a glow following exposure to light. The material absorbs the energy of the light to exhibit the glowing property every time it is exposed.

Both reflective and phosphorescent materials have widespread commercial acceptance today. Applications of these materials are, however, somewhat limited. The availability of phosphorescent polymer-containing compositions has not found widespread commercial acceptance in many areas of commercial vehicle design that could incorporate the versatility and advantages thereof. For example, it is well known that more expensive luxury vehicles utilize lighting systems around keyholes and locks that facilitate use thereof during the evening hours. It is not uncommon for the driver of a vehicle to attempt to insert a key in a lock during the evening hours and, being unable to find the exact area of the lock, inadvertently scratch the vehicle around the lock leading to both damage and frustration. It is also a safety consideration to be able to quickly unlock and enter one's vehicle during evening hours. The more expensive vehicles containing keyhole light systems are, in some instances however, considered expensive indulgences and many vehicles do not contain such systems. The same holds true for unpowered vehicles such as bicycles where the need for visibility at night goes beyond luxury and indulgence and is one of clear safety. It would thus be an advantage to overcome the limitations of the prior art by providing a vehicle accessory affording both safety, reliability and functionality in these areas.

The present invention overcomes certain of these problems of the prior art by providing a phosphorescent polymer-containing composition utilized in a vehicle accessory for keyholes and tires. The present invention provides a phosphorescent composition accessory system. Included are vehicle side moldings, valve stem caps and keyhole protective shields that may be affixed around a keyhole. These items serve to both illuminate the areas, once exposed to light, as well as protect these areas and facilitate their use (e.g. enlarged valve stem covers which may be gripped easier). In this manner the user of an automobile may more easily and rapidly find the hole for the automotive key during evening hours as long as some light has excited the material prior to use. Both the light and the presence of the material in a plastic state will protect the vehicle as well as facilitate the use thereof. Likewise the use of phosphorescent material in tire valve stem caps will allow not only ease in locating the valve stem at night in the event of an emergency but also provide an aesthetically pleasing design during use of the automobile. The design appears as a circle due to the movement of the automobile for a prolonged period of time once the automobile has turned from light exposure onto a dark area. This enhances the visibility of the automobile and/or bicycle or the vehicle upon which it is applied to promote safety.

SUMMARY OF THE INVENTION

The present invention pertains to phosphorescent polymer-containing vehicle accessories for enhancing the use of the vehicle. More particularly, one aspect of the invention includes a phosphorescent vehicle part identification accessory comprising an article of molded plastic having formed therewith a phosphorescent compound adapted for glowing for a period of time following exposure to light energy. Means are provided for securing the phosphorescent article to the vehicle in a location thereon for receiving illumination from other vehicles and external light sources and providing a decaying glow therefrom. The accessory may comprise a vehicle wheel valve stem cap or a tab adapted for positioning about a vehicle keyhole. The tab is constructed with means for securing it to the vehicle around the keyhole and the tab is further constructed with an aperture therethrough for circumferentially engaging the keyhole therearound.

In another aspect, the invention includes a method of identifying select vehicle parts and the motion thereof in relative darkness. The method comprising the steps of providing a phosphorescent compound and molding the phosphorescent compound into a vehicle part identification accessory. Means are provided for securing the vehicle accessory to the vehicle in a position for receiving illumination from other vehicles and other lights during relative darkness. The vehicle is then operated during relative darkness for intermittent exposure to illumination which imparts a luminescent glow to the phosphorescent accessories.

BRIEF DESCRIPTION OF THE DRAWINGS

For a more complete understanding of the present invention and for further objects and advantages thereof, reference may now be had to the following description taken in conjunction with the accompanying drawings in which.

DETAILED DESCRIPTION

Figure 1:
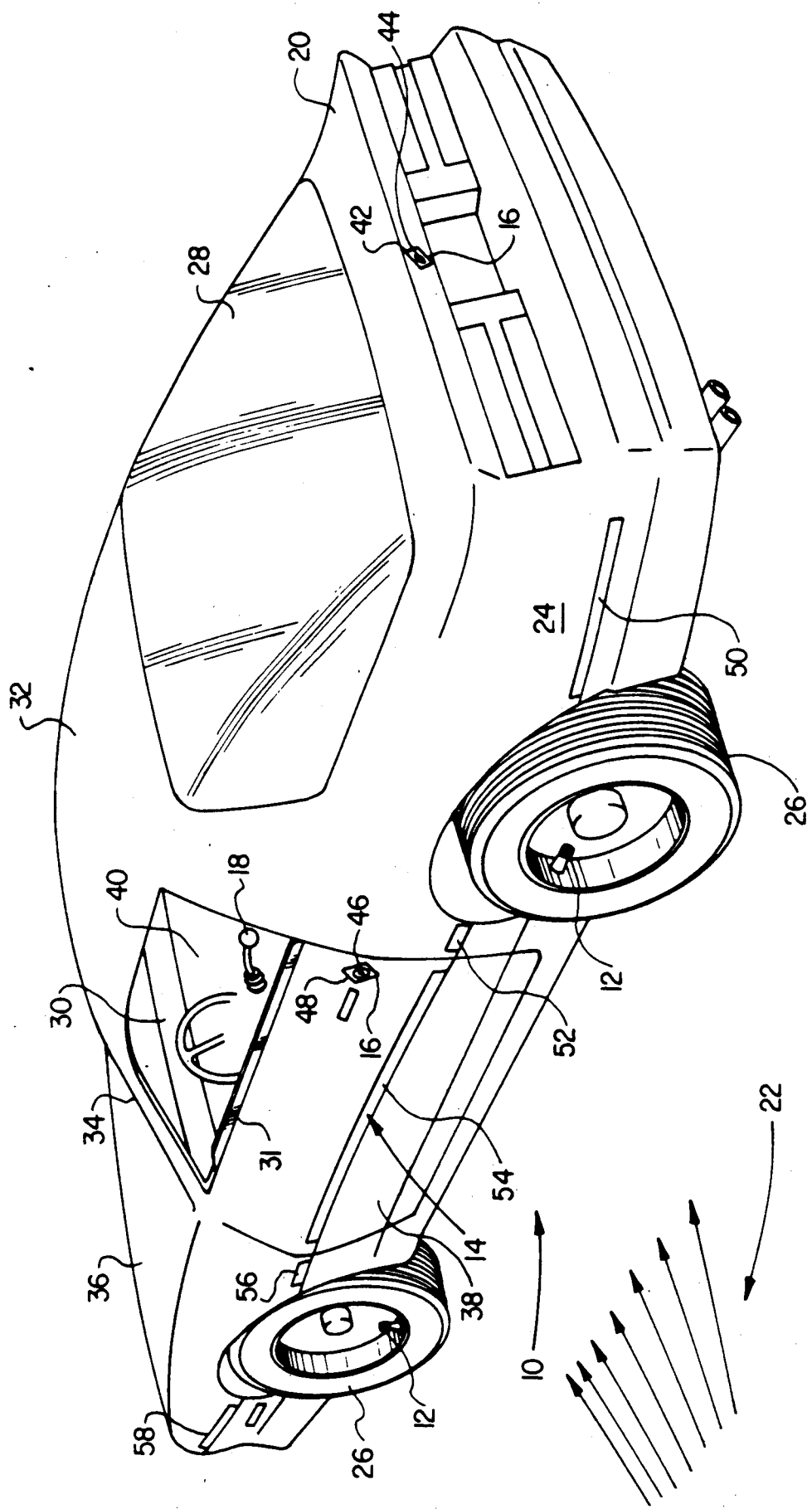
FIG. 1 is a perspective view of a vehicle having a plurality of phosphorescent vehicle accessories assembled thereto and constructed in accordance with the principles of the present invention.

Referring first to FIG. 1, there is shown a vehicle having assembled thereto a plurality of phosphorescent vehicle accessories facilitating the visibility of both regions of the vehicle as well as the vehicle itself in the night-time hours. It is well known that phosphorescent compounds may be molded into a variety of shapes and apparatus. The utilization of a phosphorescent compound permits the article into which it is molded to glow in the dark for a period of time following the exposure of the article to light energy. The glow following exposure of the article to light diminishes over a period of time depending, to some extent, on the concentration of the phosphorescent compound molded therein.

The utilization of phosphorescent compounds in such articles has found some degree of commercial acceptance in, for example, toys. It is well known that children enjoy the visual effect of toy monsters, animals, bugs, the like glowing in the dark after a brief exposure to light. This novelty is also helpful in maintaining a child's interest in the item. This interest is manifest by a continual observation but the underlying reason for the interest is the fact that the article glows in an unexpected manner once light has shown thereon. This basic underlying principle is herein incorporated in an advantageous way by incorporating the phosphorescent compound in an article that may be readily viewed in a manner facilitating safety and efficiency. As may be recognized, vehicles being driven at night are frequently illuminated by street lights and headlights of other vehicles. The time periods between such illumination obviously vary, but quite often the interval is no greater than around three to five minutes. This particular period of time is well within the "glow decay" time for a conventional phosphorescent article and the observation of the unilluminated vehicle during this three minute period enhances the visibility of the vehicle, the safety of the driver or rider as well as any various novel features thereto. "Glow Decay" time, as used herein, is the period of time of observable glow of the phosphorescent compound. Higher concentrations of phosphorescent material, in the order of 25% to 30% provides a much more intense glow during this "glow decay" time. The glow can last, however, up to two hours, or more, to further assist the operator of the vehicle in locating various parts of the vehicle,. as described in more detail below.

Still referring to FIG. 1 and addressing the points raised above, the present invention incorporates an accessory system 10 comprising a plurality of valve stem covers 12, protective strips 14, keyhole covers 16 and gear shift knob 18. Each of these accessory items is affixed to a vehicle 20. The term vehicle is used herein to include any motorized or non-motorized conveyance adapted for carrying one or more persons including automobiles, trucks, bicycles, wagons, carts, motorcycles, trailers and the like. A conventional type of vehicle 20 is shown herein for the purposes of illustration and is shown in line with rays of light 22 being cast thereon. The light rays 22 are shown by a series of arrows illustrating the manner in which headlamps of other vehicles, streetlights or other lighting sources would illuminate the vehicle 20. In this manner the phosphorescent accessory items 12, 14, 16 and 18 shown herein would be energized for subsequent glowing as is described in more detail below. One such phosphorescent pigment is produced by Conrad-Hanovia, Incorporated as Phosphorescent Pigment P-1000.

Still referring to FIG. 1, the motorized vehicle 20 is constructed with a body 24 having tires 26 upon which are mounted the valve stem covers 12. The vehicle 20 further includes a rear window 28 and side window 30 through which light from other sources can illuminate the inside of the vehicle 20. The top of the vehicle will be, in many instances, constructed with a sunroof and/or a convertible top so that light can likewise be cast therein particularly from overhead streetlights and from the sun during the day. The front windshield 34 is likewise shown behind the hood 36 over which light will be received from on-coming vehicles. A door 38 is shown herein with a phosphorescent strip 14 adhered thereto. Opening of the door 38 exposes the inside of the vehicle 40 to light for illumination of the phosphorescent gearshift knob 18.

Referring still to FIG. 1, the accessory systems in the present invention includes a rear keyhole cover 42 which is affixed about the trunk lock 44. It is this region of the vehicle which is most often illuminated by vehicles therebehind. The time period between parking the vehicle and gaining access to the trunk is usually less than the glow decay time of the phosphorescent material described above. This enables the driver of the vehicle 20 to easily find the trunk keyhole. The cover 42 therearound likewise protects the keyhole in the event it is difficult to insert the key therein. A lock 46 is shown in the door 38 with a specific keyhole cover 48 shown in a diamond configuration therearound. The side of the vehicle is likewise often illuminated by other vehicles, even in parking lots. When the vehicle is parked in a parking lot where even remote illumination can be imparted thereto, a type of glow would then be possible even in remote and dark locations to the facilitate safety of the driver attempting to gain access thereto. The speed of access into the vehicle can many times be critical in protecting the driver from other persons in the vicinity. It is well known that the vehicle itself can provide safety for the driver and therefore the present accessory system 10 facilitates not only convenience to the user, protection to the vehicle but also safety to the driver. In this regard the sidestrip 14 further comprises a rear panel strip 50, with intermediate strip 52, the wide door strip 54, a frontal strip 56 and a forward strip 58. These strips may be on both sides of the vehicle and/or on the front and rear thereof. It is particularly the side of an automobile which is most convenient for the present invention due to the fact that relatively little electrical illumination is generally provided therewith as compared to commercial trucks. Obviously such strips would appear on both sides of the vehicle.

Figure 2A:
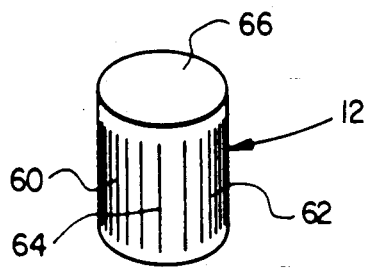
FIGS. 2A through 2D comprise (a) perspective view (2A) and side elevational views (2B-2D) of a plurality of phosphorescent valve stem cap designs constructed in accordance with the principles of the present invention.
Figure 2B:
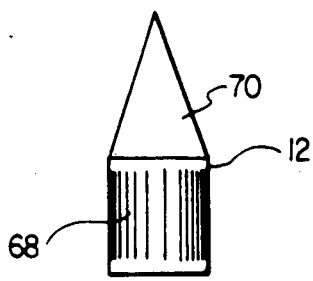
Figure 2C:
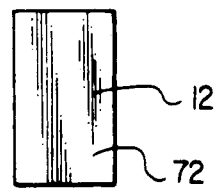
Figure 2D:
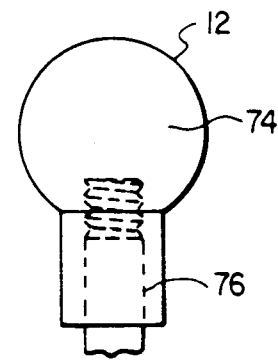

Referring now to FIG. 2A, there is shown a perspective view of a valve stem cover 12 constructed in accordance with the principles of the present invention. A phosphorescent compound is molded into the plastic valve stem cover so as to provide a glow after exposure to light. The particular configuration of the valve stem cover 12 of FIG. 2A is that of a conventional cylindrical element 60. The element 60 includes a cylindrical body portion 62 having a ridged or roughened section 64 formed thereon and a substantially planer top portion 66. The inside of this conventional valve stem cover (not shown) is threaded, as is conventional in the prior art. This particular valve stem cover 12 is also shown in alternate embodiments of FIGS. 2B through 2D. In FIG. 2B, a valve stem cover 68 having a pointed top 70 is shown for providing a variation in the aesthetic configuration. In FIG. 2C a rectangular configuration 72 is shown, while FIG. 2D a spherical top 74 is shown mounted over to a conventional valve stem 76 shown in phantom. In each of these configurations the securement mechanism is of conventional design utilizing threads formed within each valve stem cover. The phosphorescent glow provides the appearance of a circle as the vehicle wheel 26 moves. The circle shape is well known to exist with a lighted object that spins and the appearance on the wheel from the phosphorescent glow provides an interesting and noticeable appearance, particularly in combination with front and rear wheels. This glow appearing on a dark road in conjunction with conventional lighting of the vehicle 20 provides both safety and an aesthetically pleasing appearance.

Figure 3A:
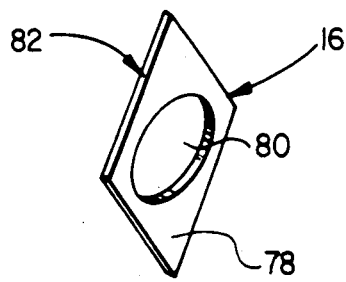
FIGS. 3A through 3D comprise (a) perspective view (3A) and front elevational views (3B-3D) of a plurality of phosphorescent keyhole protection devices constructed in accordance with the principles of the present invention.

Referring now to FIG. 3A, there is shown a perspective view of a keyhole cover 16. In this particular embodiment a diamond shaped device 78 is shown having aperture 80 formed therethrough. The aperture 80 is constructed of the diameter of the keyhole 46 of the vehicle 20 shown in FIG. 1. The backside 82 of the cover 78 is constructed with suitable adhesives such as the 3-M Manufacturing, Inc. product ISOTAC transfer adhesive, for securement to the vehicle. This adhesive may also be a double sided tape or a conventional glue. By activating the adhesive by either pealing off the protective layer or applying a bonding element thereto. The cover 78 may be secured around the keyhole 46 which projects the aperture. The cover 78 is formed by suitably plastic so as to provide a conforming configuration. The plastic having a thickness on the order of 1/16 inches and formed of polyurethane material has been found acceptable.

Figure 3B:
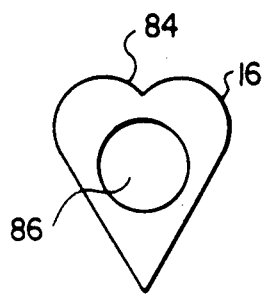
Figure 3C:
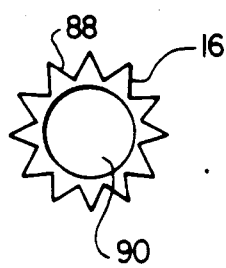
Figure 3D:
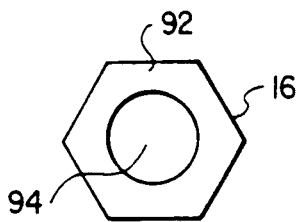

Referring now to FIGS. 3B, 3C and 3D, the alternative embodiments of the keyhole cover. In FIG. 3B is shown a heart shaped cover 84 is illustrated with an aperture 86 formed therethrough. In FIG. 3C a multi-pointed star 88 is shown with an aperture 90 formed therethrough. In FIG. 3D a six-sided device 92 shown with an aperture 94 formed therethrough. In each case an adhesive backing or bonding agent is used therewith for securing the individual covers to the automobile 20. Likewise the material fitness and flexibility may vary in accordance with particular applications, but in each case a phosphorescent compound is used in conjunction therewith. The relative proportion of phosphorescent compound may be between 15% and 30% or conventional concentrations of between 5% to 10%. Other concentrations are, of course, contemplated by the present invention.

It may be seen that the particular adhesive strip 14 is not shown in specific detail. This is because the strip itself may be adhered as described above and the strip or rectangular configuration is clearly visible in FIG. 1. Also shown in FIG. 1 is the gearshift knob 18 which is shown to be constructed of a spherical configuration. It should be noted that any shape conventional use of gearshift knobs is contemplated in the spirit and scope of the present invention. It is the utilization of phosphorescent material in the gearshift knob as well as in the other elements recited herein that comprises the subject invention. The utilization of the phosphorescent material in a vehicle accessory in other elements of the vehicle not shown here are also incorporated in the present invention as long as those areas are subject to periodic illumination during periods of darkness. It is subsequent to the illumination during darkness that the effect of the phosphorescent material may be appreciated for the safety, convenience and pleasure of the driver of the vehicle.

It is thus believed that the operation and construction of the present invention will be apparent from the foregoing description. While the method and apparatus shown and described as being characterized as being preferred, it will be apparent that there are changes and modifications may be made therein without departing from the spirit and scope of the invention as defined in the following claims.

I claim:

1. A phosphorescent vehicle part identification accessory comprising an article of molded plastic having formed therewith a phosphorescent compound adapted for glowing for a period of time following exposure to light energy and means for securing said phosphorescent article to said vehicle in an exposed location thereon for receiving illumination from areas outside the vehicle including other vehicles and external light sources to thereby respond to said outside illumination by providing a decaying glow therefrom, said article comprising a vehicle interior item positioned to receive illumination from light sources outside the vehicle.

2. The apparatus as set forth in claim 1 wherein said vehicle interior item comprises a gearshift knob.

* * * * *